(12) United States Patent
Seo et al.

(10) Patent No.: US 8,147,367 B2
(45) Date of Patent: Apr. 3, 2012

(54) POWER TRAIN FOR HYBRID VEHICLE

(75) Inventors: Kangsoo Seo, Gyeonggi-do (KR);
Horim Yang, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 303 days.

(21) Appl. No.: 12/629,386

(22) Filed: Dec. 2, 2009

(65) Prior Publication Data

US 2011/0015019 A1 Jan. 20, 2011

(30) Foreign Application Priority Data

Jul. 15, 2009 (KR) .......................... 10-2009-0064533

(51) Int. Cl.
*F16H 3/72* (2006.01)
(52) U.S. Cl. ............................................ 475/5
(58) Field of Classification Search ........... 475/5
See application file for complete search history.

(56) References Cited

U.S. PATENT DOCUMENTS

| | | | |
|---|---|---|---|
| 5,683,325 A | 11/1997 | Moroto et al. | |
| 2011/0111908 A1* | 5/2011 | Kim et al. | 475/5 |
| 2011/0111909 A1* | 5/2011 | Kim et al. | 475/5 |

FOREIGN PATENT DOCUMENTS

| | | |
|---|---|---|
| JP | 8-261300 A | 10/1996 |
| JP | 2003-130149 A | 5/2003 |
| JP | 2006-282070 A | 10/2006 |
| JP | 2007-314032 A | 12/2007 |

* cited by examiner

*Primary Examiner* — Dirk Wright
(74) *Attorney, Agent, or Firm* — Edwards Wildman Palmer LLP; Peter F. Corless (57) ABSTRACT

The present invention can achieve hybrid modes with an input split mode, output split mode, and complex split mode, by using only one set of stepped pinion planetary gear sets, one set of single pinion planetary gear sets, three clutches, and two brakes, ensure the space of a vehicle with a compact configuration and reduce the cost by implementing five stages of fixed gear ratio mode, and achieve continuous transmission gear ratios, and improve the fuel efficiency of the vehicle by changing the modes in accordance with the traveling conditions of the vehicle. Further, since it is possible to reduce the performance required for a motor generator under the same conditions, by improving the performance of the system, it is possible to reduce the cost of the vehicle. Accordingly, the present invention provides a power train for a hybrid vehicle that can contribute to reduce the cost of a vehicle.

12 Claims, 7 Drawing Sheets

| | CL1 | CL2 | CL3 | BK1 | BK2 | TRANSMISSION GEAR RATIO AND MODE |
|---|---|---|---|---|---|---|
| FIRST STAGE OF FIXED GEAR RATIO | ● | | ● | ● | | FIXED STAGE TRANSMISSION GEAR RATIO A IMPLEMENTED |
| SECOND STAGE OF FIXED GEAR RATIO | | ● | ● | ● | | FIXED STAGE TRANSMISSION GEAR RATIO B IMPLEMENTED |
| THIRD STAGE OF FIXED GEAR RATIO | ● | ● | | | ● | FIXED STAGE TRANSMISSION GEAR RATIO C IMPLEMENTED |
| FOURTH STAGE OF FIXED GEAR RATIO | ● | ● | ● | | | FIXED STAGE TRANSMISSION GEAR RATIO D IMPLEMENTED |
| FIFTH STAGE OF FIXED GEAR RATIO | | ● | ● | | ● | FIXED STAGE TRANSMISSION GEAR RATIO E IMPLEMENTED |
| INPUT SPLIT MODE | | | ● | ● | | POWER SPLIT STRUCTURE THAT CAN BE USED AT HIGH TRANSMISSION GEAR RATIO AND LOW VELOCITY |
| OUTPUT SPLIT MODE | ● | ● | | | | POWER SPLIT STRUCTURE THAT CAN BE USED AT MIDDLE TRANSMISSION GEAR RATIO AND MIDDLE VELOCITY |
| MULTIPLE SPLIT MODE | | ● | ● | | | POWER SPLIT STRUCTURE THAT CAN BE USED AT MIDDLE-LOW TRANSMISSION GEAR RATIO AND MIDDLE-HIGH VELOCITY |

POWER TRAIN FOR HYBRID VEHICLE

CROSS-REFERENCE TO RELATED APPLICATIONS

The present application claims priority to Korean Patent Application Number 10-2009-0064533 filed Jul. 15, 2009, the entire contents of which application is incorporated herein for all purposes by this reference.

BACKGROUND

1. Technical Field

The present disclosure relates to a power train for a hybrid vehicle, in more detail a power train structure for a hybrid vehicle that uses an engine, which is an internal combustion engine, and a motor generator driven by electricity as a power source providing driving force to a driving wheel.

2. Related Art

Hybrid vehicles using an engine and a motor generator improve fuel efficiency of the vehicles by achieving functions of idle stop and regenerative braking, on the basis of a technology of driving the vehicles at low velocity by using power from the motor generator having relatively excellent low-velocity torque characteristics and driving the vehicles at high velocity by using power from the engine having relatively excellent high-velocity characteristics.

Further, hybrid vehicles do not produce exhaust gas from the engine when being driven only by a motor generator, which is recognized as an environmental-friendly vehicle technology having advantages of improving fuel efficiency and reducing exhaust gas.

The power train for hybrid vehicles is required to provide sufficient driving force and high fuel efficiency.

The information disclosed in this Background section is only for enhancement of understanding of the general background of the invention and should not be taken as an acknowledgement or any form of suggestion that this information forms the prior art already known to a person skilled in the art.

BRIEF SUMMARY OF THE DISCLOSURE

Various aspects of the present invention are directed to provide a power train for a hybrid vehicle that makes it possible to ensure sufficient driving force in the entire driving region of the vehicle and improve the fuel efficiency, by implementing a multiple mode based on power split type, providing a plurality of fixed gear ratios, such as shift stages of a transmission, and allowing the vehicle to be traveled in the multiple mode of various traveling modes in accordance with the traveling conditions of the vehicle.

In one aspect, the present invention provides a power train for a hybrid vehicle, comprising: a first planetary gear set that has at least four independent rotary elements one of which is connected to an input shaft; a second planetary gear set that has a rotary element connected to an output element; a first clutch that is configured to selectively connect two rotary elements of the first planetary gear set; a second clutch that is configured to selectively connect one rotary element of the first planetary gear set and one rotary element of the second planetary gear set; a third clutch that is configured to selectively connect another rotary element of the first planetary gear set and another rotary element of the second planetary gear set; a first brake that is configured to restrain rotation of one rotary element of the second planetary gear set; a second brake that is configured to restrain rotation of another rotary element of the second planetary gear set; and at least two or more power sources that are connected to supply driving force to the first planetary gear set and the second planetary gear set.

Preferably, the second clutch may be disposed between the rotary element, which is connected with the first clutch, of the first planetary gear set and a rotary element of the second planetary gear set, the first brake may be connected to restrain the rotary element of the second planetary gear set which is connected with the second clutch, and the second brake may be connected to restrain the rotary element of the second planetary gear set which is connected with the third clutch. In this case, the power source may include an engine connected to the input shaft, a first motor generator connected with a rotary element of the first planetary gear set, and a second motor generator connected with a rotary element of the second planetary gear set. Further, the first motor generator may be directly connected to any one of the rotary elements of the first planetary gear set, selectively connected to another one, and selectively connected to any one of the rotary elements of the second planetary gear set, and the second motor generator may be connected to the rotary element of the second planetary gear set which is connected with the second brake. Suitably, the first planetary gear set may have a stepped pinion of two steps, including a first ring gear-A and a first ring gear-B engaged with the steps of the stepped pinion, respectively, and the second planetary gear set may be a single pinion planetary gear set having three rotary elements. In this case, the input shaft may be connected to a first carrier, which is the rotary shaft of the stepped pinion, of the first planetary gear set, and the output element may be connected to the rotary element, which are not connected to the first brake and the second brake, of the second planetary gear set.

Suitably, in this case, a first sun gear of the first planetary gear set may be connected to the first motor generator, the first carrier is connected to the engine, the first ring gear-A may be connected to the first motor generator through the first clutch, and the first ring gear-B may be connected to the second planetary gear set through the third clutch. Also, a second sun gear of the second planetary gear set may be connected with the second motor generator and the second brake while being connected to the first planetary gear set through the third clutch, a second carrier of the second planetary gear set may be connected with the output element, and a second ring gear of the second planetary gear set may be connected to the first brake while being connected to the first motor generator through the second clutch. In this case, the first ring gear-A may be engaged with the pinion having a relatively small diameter of the stepped pinion of the first planetary gear set, and the first ring gear-B may be engaged with the pinion having a relatively large diameter.

In another aspect, the present invention provides a power train for a hybrid vehicle, comprising: an input shaft that receives power from an engine; an output element that outputs the power; a first planetary gear set that is connected with the input shaft and has a first number of rotary elements; a second planetary gear set that is disposed coaxially with the first planetary gear set, connected with the output element, and has a second number of rotary elements; a first clutch that is configured to selectively connect two elements of the first planetary gear set; a second clutch that is configured to selectively connect one rotary element of the first planetary gear set and one rotary element of the second planetary gear set; a third clutch that is configured to selectively connect another rotary element of the first planetary gear set and another rotary element of the second planetary gear set; a first brake that is configured to restrain rotation of one rotary element of the second planetary gear set; and a second brake that is configured to restrain rotation of another rotary element of the second planetary gear set.

Preferably, the first planetary gear set may have four rotary elements including a stepped pinion of two steps, the second planetary gear set may be a single pinion planetary gear set including three rotary elements, the rotary element of the second planetary gear set which is connected to the first brake may be connected to a rotary element of the first planetary gear set through the second clutch, and the rotary element of the second planetary gear set which is connected to the second brake may be connected to a rotary element of the first planetary gear set through the third clutch. In this case, the engine may be connected to a first carrier of the first planetary gear set, the first motor generator may be directly connected to a first sun gear of the first planetary gear set, and connected to a second ring gear of the second planetary gear set through the second clutch, the second motor generator may be connected to a second sun gear of the second planetary gear set, the first brake may be connected to a second ring gear of the second planetary gear set, the second brake may be connected to a second sun gear of the second planetary gear set, and the output element may be connected to a second carrier of the second planetary gear set. Further, suitably, a first ring gear-A may be engaged with the pinion having a relatively small diameter of the stepped pinion and a first ring gear-B is engaged with the pinion having a relatively large diameter, the first ring gear-A may be connected to the first motor generator through the first clutch, and the first ring gear-B may be connected to the second sun gear of the second planetary gear set through the third clutch.

The power trains for a hybrid vehicle according to the present invention can achieve hybrid modes with an input split mode, output split mode, and complex split mode, by using only one set of stepped pinion gear sets, one set of single pinion planetary gear sets, three clutches, and two brakes, ensure the space of a vehicle with a compact configuration and reduce the cost by implementing five stages of fixed gear ratio mode, and achieve continuous transmission gear ratios, and improve the fuel efficiency of the vehicle by changing the modes in accordance with the traveling conditions of the vehicle. Further, since it is possible to reduce the performance required for a motor generator under the same conditions, by improving the performance of the system, it is possible to reduce the cost of the vehicle.

The above and other features and advantages will be apparent from or are set forth in more detail in the accompanying drawings, which are incorporated herein, and the following Detailed Description of the Invention, which together serve to explain certain principles of the present invention.

DETAILED DESCRIPTION OF EMBODIMENTS

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention (s) is/are intended to cover not only the exemplary embodiments, but also various alternatives, modifications, equivalents and other embodiments, which may be included within the spirit and scope of the invention as defined by the appended claims.

Figure 1:
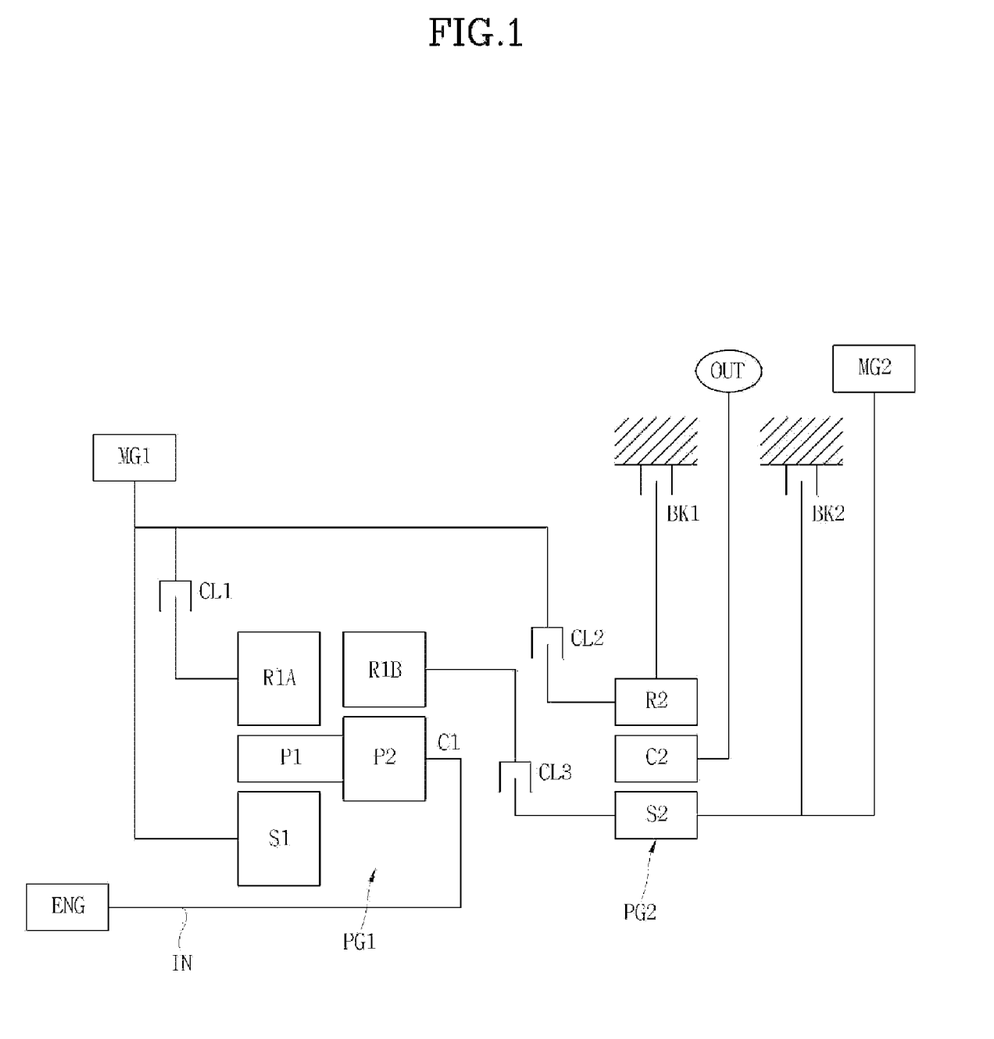
FIG. 1 is a diagram illustrating the configuration of a power train for a hybrid vehicle according to the present invention.
Figure 2:
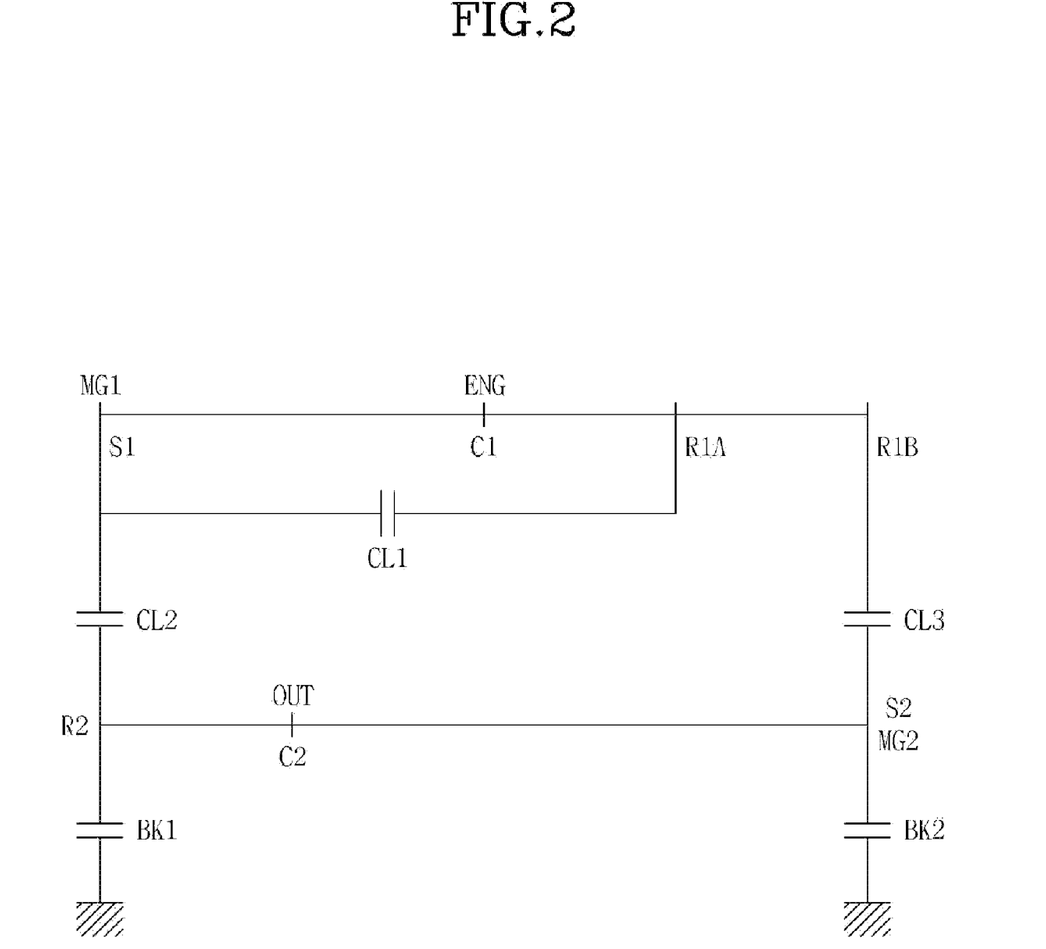
FIG. 2 is a simple lever diagram of the power train for a hybrid vehicle shown in FIG. 1.

Referring to FIG. 1, the power train according to an embodiment of the present invention includes: a first planetary gear set PG1 that has four independent rotary elements, one of which is connected to an input shaft IN; a second planetary gear set PG2 that rotary elements, one of which is connected to an output element; a first clutch CL1 that is disposed to selectively connect two rotary elements of the first planetary gear set PG1; a second clutch CL2 and a third clutch CL3 that are disposed to selectively connect two rotary elements of the first planetary gear set PG1 and the second planetary gear set PG2, respectively; a first brake BK1 and a second brake BK2 that are provided to restrain rotation of two rotary elements of the second planetary gear set PG2; and at least two or more power sources that are connected to supply driving force to the first planetary gear set PG1 and the second planetary gear set PG2.

The second clutch CL2 is disposed between the rotary element of the first planetary gear set PG1 that is connected with the first clutch CL1 and a rotary element of the second planetary gear set PG2. The first brake BK1 is connected to restrain the rotary element of the second planetary gear set PG2 that is connected with the second clutch CL2. The second brake BK2 is disposed to restrain the rotary element of the second planetary gear set PG2 that is connected with the third clutch CL3.

The power source includes an engine ENG connected to the input shaft IN, a first motor generator MG1 connected with a rotary element of the first planetary gear set PG1, and a second motor generator MG2 connected with the rotary elements of the second planetary gear set PG2.

That is, the first motor generator MG1 is directly connected to any one of the rotary elements of the first planetary gear set PG1 so as to be selectively connected to another one. The first motor generator MG1 is also selectively connected to any one of the rotary elements of the second planetary gear set PG2.

Further, the second motor generator MG2 is connected to the rotary element of the second planetary gear set PG2 that is connected with the second brake BK2.

The output element OUT is connected to the driving wheels of the vehicle through a final gear to transmits power, which is transmitted through the first planetary gear set PG1 and the second planetary gear set PG2 from engine ENG, the first motor generator MG1, and the second motor generator MG2, to the driving wheels.

Further, a high-voltage battery is connected to the first motor generator MG1 and the second motor generator MG2 through an inverter, such that they can charge the high-voltage battery in regenerative braking and generate driving force, respectively, using the electricity of the high-voltage battery.

Preferably, the first planetary gear set PG1 has a stepped pinion of two steps, including a first ring gear-A R1A and a first ring gear-B R1B engaged with the steps of the stepped pinion, respectively, and the second planetary gear set PG2 is a single pinion planetary gear set having three rotary elements.

The input shaft IN is connected to a first carrier C1, which is the rotary shaft of the stepped pinion, of the first planetary gear set PG1, the output element OUT is connected to the rotary element, which is not connected to the first brake BK1 and the second brake BK2, of the second planetary gear set PG2.

That is, a first sun gear S1 of the first planetary gear set PG1 is connected to the first motor generator MG1, the first carrier C1 is connected to the engine ENG, the first ring gear-A R1A is connected to the first motor generator MG1 through the first clutch CL1, and the first ring gear-B R1B is connected to the second planetary gear set PG2 through the third clutch CL3.

A second sun gear S2 of the second planetary gear set PG2 is connected with the second motor generator MG2 and the second brake BK2 while being connected to the first planetary gear set PG1 through the third clutch CL3, a second carrier C2 of the second planetary gear set PG2 is connected with the output element OUT, and a second ring gear R2 of the second planetary gear set PG2 is connected to the first brake BK1 while being connected to the first motor generator MG1 through the second clutch CL2.

In this configuration, the first ring gear-A R1A is engaged with the pinion having a relatively small diameter of the stepped pinion and the first ring gear-B R1B is engaged with the pinion having a relatively large diameter.

Figure 3:
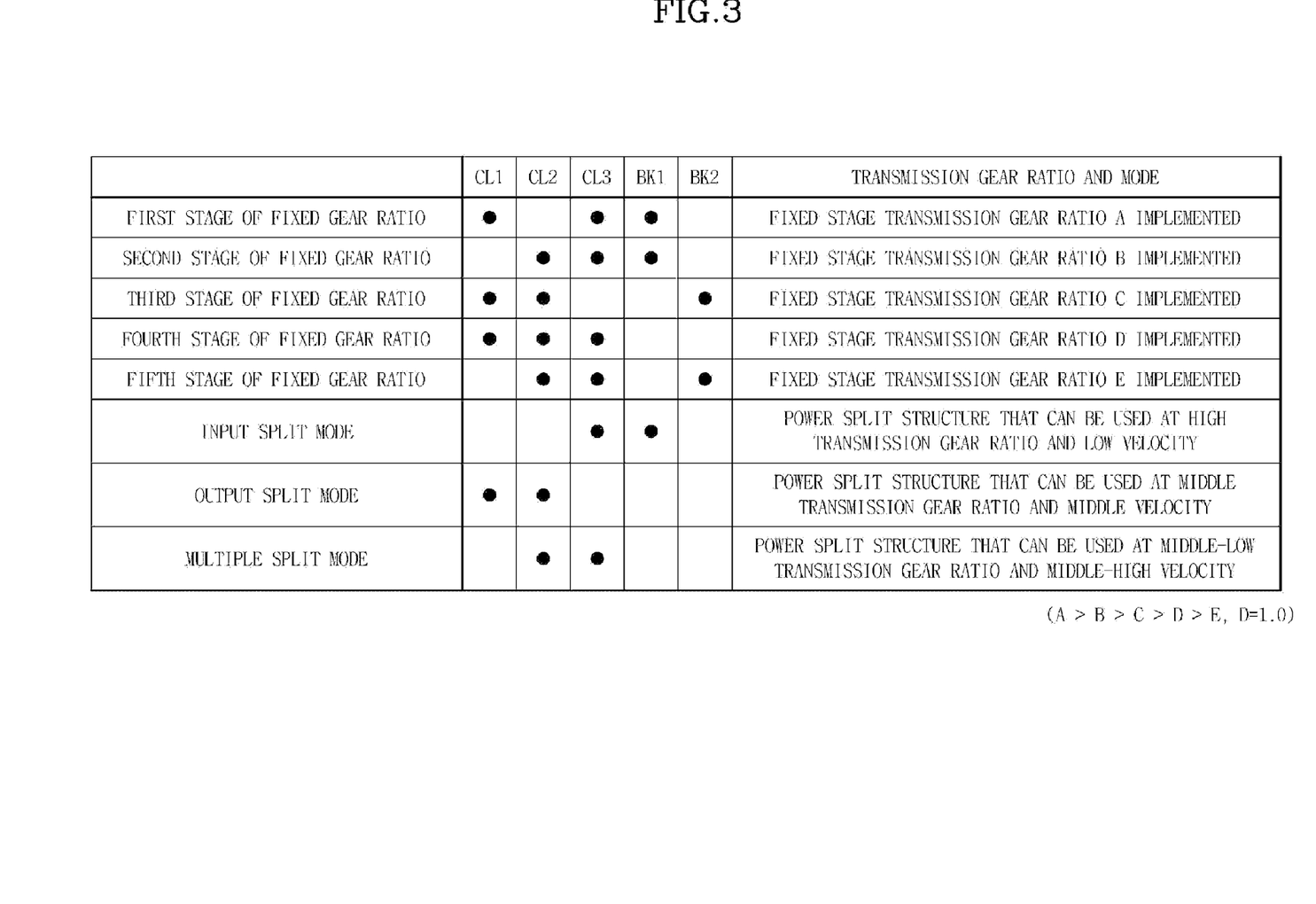
FIG. 3 is a diagram illustrating operational modes of the power train of FIG. 1.

The operation modes of the power train having the above configuration is described hereafter with reference to FIG. 3.

As shown in FIG. 3, the power train can be operated in first to fifth stage fixed gear ratio modes, an input split mode, an output split mode, and a multiple split mode.

The first stage fixed gear ratio mode is achieved by engaging the first clutch CL1, the third clutch CL3, and the first brake BK1 and disengaging the second clutch CL2 and the second brake BK2, in which a transmission gear ratio A, which is the highest transmission gear ratio that the power train can achieve is implemented.

Figure 4:
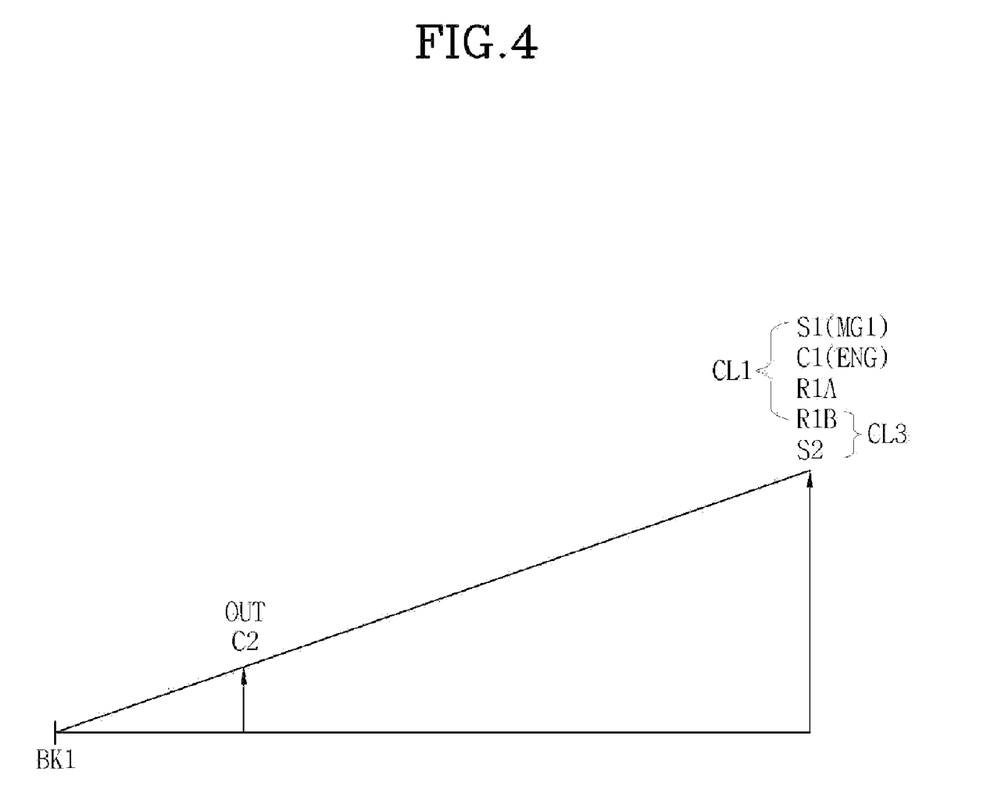
FIG. 4 is a lever analysis diagram illustrating the operation in the first fixed gear ratio mode of the power train of FIG. 1.

That is, as the first clutch CL1 is engaged, the first sun gear S1 and the first ring gear-A R1A are directly connected and the stepped pinion engaged therebetween cannot rotate. The first ring gear-B R1B is integrally connected with the first sun gear S1 and the first ring gear-A R1A. As a result, all of the rotary elements of the first planetary gear set PG1 are integrally connected. As the third clutch CL3 is engaged, the first planetary gear set PG1 is connected to the second sun gear S2 of the second planetary gear set PG2. In this state, the first brake BK1 is engaged to fix the second ring gear R2 of the second planetary gear set PG2. Accordingly, the level analysis diagram shown in FIG. 4 is implemented. In this mode, the power from engine ENG is reduced to the transmission gear ratio A and then outputted to the output element OUT through the second carrier C2.

The second stage fixed gear ratio mode is achieved by engaging the second clutch CL2, the third clutch CL3, and the first brake BK1 and disengaging the other elements, in which a transmission gear ratio B smaller than the transmission gear ratio A is implemented.

Figure 5:
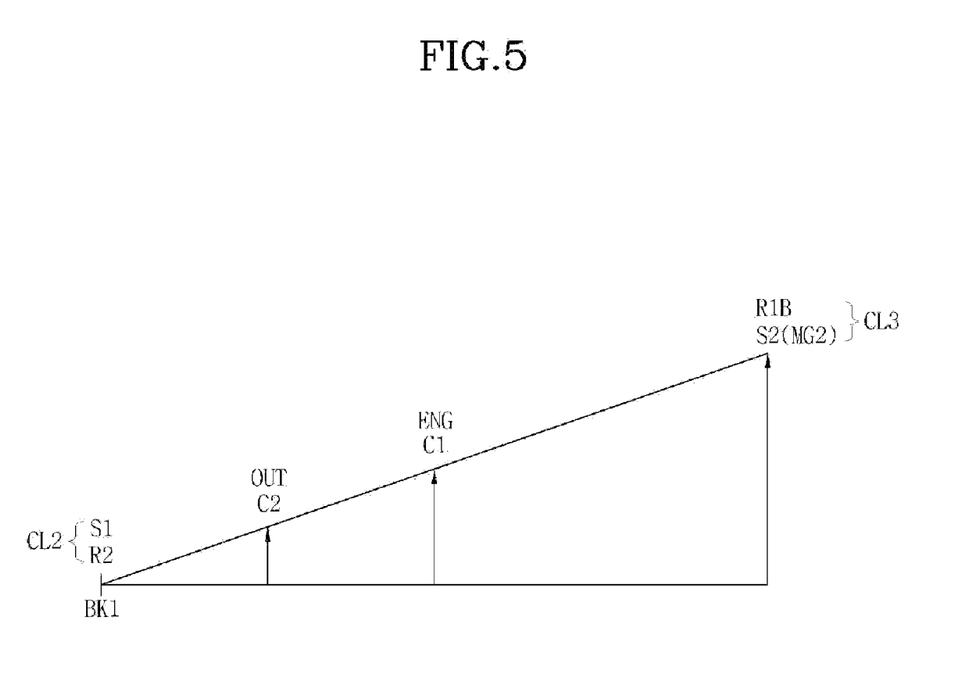
FIG. 5 is a lever analysis diagram illustrating the operation in the second fixed gear ratio mode of the power train of FIG. 1.

That is, the first sun gear S2 and the second sun gear R2 are engaged with each other by the second clutch CL2 and fixed by the first brake BK1, and the second sun gear S2 and the first ring gear-B R1B are engaged by the third clutch CL3, such that the first planetary gear set PG1 and the second planetary gear set PG2 form a single straight level with one end fixed and the input from the engine ENG is outputted at the transmission gear ratio B through the second carrier C2, as shown in FIG. 5.

Figure 6:
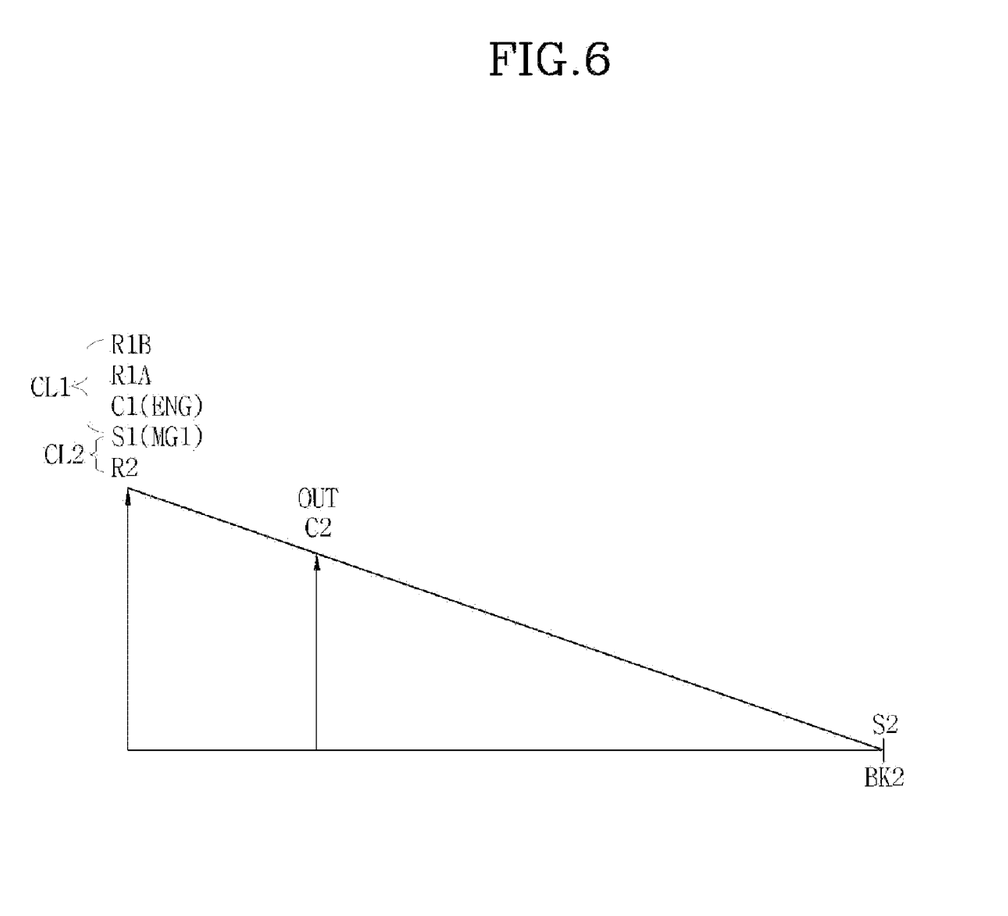
FIG. 6 is a lever analysis diagram illustrating the operation in the third fixed gear ratio mode of the power train of FIG. 1.

The third stage fixed gear ratio mode is achieved by engaging the first clutch CL1, the second clutch CL2, and the second brake BK2. As shown in FIG. 6, the rotary elements of the first planetary gear set PG1 are integrally connected by the first clutch CL1 and are also integrally connected with the second ring gear R2 by the second clutch CL2, in which the second sun gear S2 of the second planetary gear set PG2 is fixed by the second brake BK2, such that the power from the engine ENG applied to the second ring gear R2 is outputted at a transmission gear ratio C smaller than the transmission gear ratio B through the second carrier C2 by the gear ratio of the second planetary gear set PG2.

The fourth stage fixed gear ratio mode is achieved by engaging the first clutch CL1, the second clutch CL2, and the third clutch CL3. All of the rotary elements of the first planetary gear set PG1 are integrally connected by the first clutch CL1, the first sun gear S1 is connected with the second ring gear R2 by the second clutch CL2, the first ring gear-B R1B is connected with the second sun gear S2 by the third clutch CL3. As a result, all of the rotary elements of the second planetary gear set PG2 are integrally locked to the rotary elements of the first planetary gear set PG1, such that the power transmitted from engine ENG to the first carrier C1 is outputted at the transmission gear ratio D, which is 1:1 transmission gear ratio, through the second carrier C2 of the second planetary gear set PG2, in which D<C.

Figure 7:
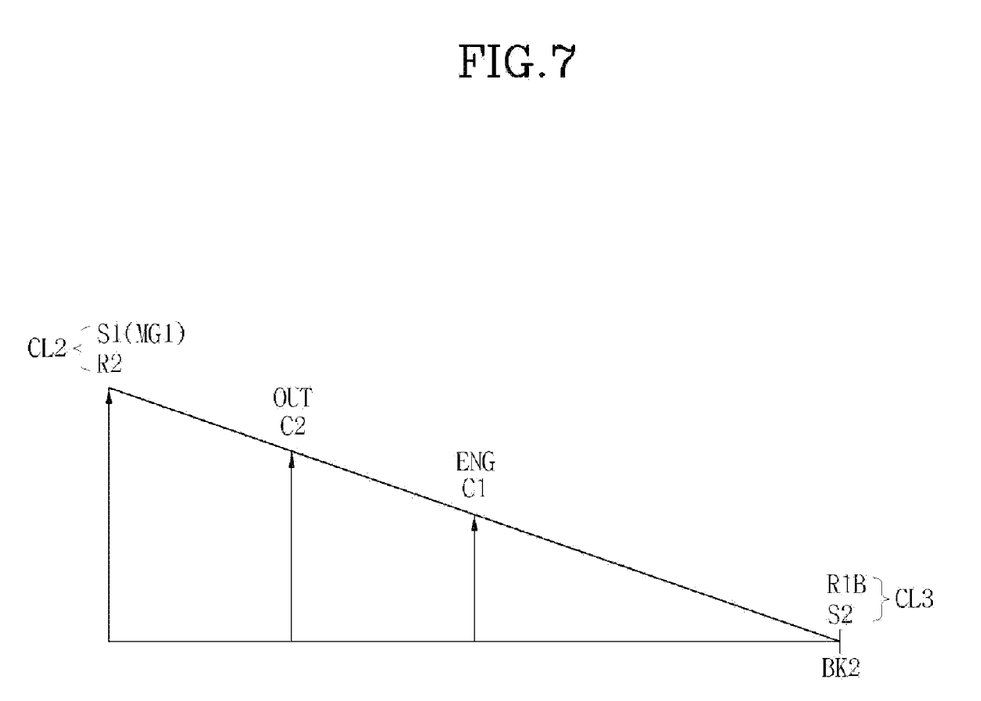
FIG. 7 is a lever analysis diagram illustrating the operation in the fifth fixed gear ratio mode of the power train of FIG. 1.

The fifth stage fixed gear ratio mode is achieved by engaging the second clutch CL2, the third clutch CL3, and the second brake BK2. That is, the second ring gear R2 and the first sun gear S1 are engaged by the second clutch CL2 and the first ring gear-B R1B and the second sun gear S2 are engaged by the third clutch CL3, such that the level analysis diagram shown in FIG. 7 are achieved, in which the first planetary gear set PG1 and the second planetary gear set PG2 are overlapped in a straight line with respective gear ratios. Accordingly, the power from the engine ENG applied to the first carrier C1 is outputted at an increased transmission gear ratio E through the second carrier C2.

On the other hand, the input split mode is achieved by engaging the third clutch CL3 and the first bake BK1 and disengaging the other elements. In this mode, the second motor generator MG2 connected to the second sun gear S2 is connected to the second carrier C2 with a fixed gear ratio of the second planetary gear set PG2, and as a result, it is connected with the output element OUT. This mode can be used at a low velocity with a high transmission gear ratio.

The output split mode is achieved by engaging the first clutch CL1 and the second clutch CL2 and disengaging the other elements. In this mode, the second ring gear R2 and the first sun gear S1 are integrally connected by the second clutch CL2 and all of the rotary elements of the first planetary gear set PG1 are integrally connected by the first clutch CL1, such that the first motor generator MG1 is directly connected with engine ENG is achieved. This mode can be used at a middle velocity with a middle transmission gear ratio.

The multiple (complex) split mode is achieved by engaging the second clutch CL2 and the third clutch CL3 are engaged. In this mode, the first sun gear S1 and the second ring gear R2 are directly connected by the second clutch CL2 and the first ring gear-B R1B and the second sun gear S2 are directly connected by the third clutch CL3, such that the first planetary gear set PG1 and the second planetary gear set PG2 form a level analysis diagram with both ends overlapped in a free straight line, and the input of the engine ENG and the output of the second carrier C2 are disposed apart from the first motor generator MG1 connected to the first sun gear S1 and also disposed apart from the second motor generator MG2 connected to the second sun gear S2. This complex split mode can be used at a middle-high velocity with a middle-low transmission gear ratio.

The power trains according to the present invention provides advantages including the following. Hybrid modes can be achieved by a power train having a simpler structure. Also, efficient space usage is ensured by the compact configuration. In addition, manufacturing costs can be reduced. Further, continuous transmission gear ratios can be attained easily. Further, fuel efficiency can be improved.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A power train for a hybrid vehicle, comprising:
   a first planetary gear set that has at least four independent rotary elements one of which is connected to an input shaft;
   a second planetary gear set that has a rotary element connected to an output element;
   a first clutch that is configured to selectively connect two rotary elements of the first planetary gear set;
   a second clutch that is configured to selectively connect one rotary element of the first planetary gear set and one rotary element of the second planetary gear set;
   a third clutch that is configured to selectively connect another rotary element of the first planetary gear set and another rotary element of the second planetary gear set;
   a first brake that is configured to restrain rotation of one rotary element of the second planetary gear set;
   a second brake that is configured to restrain rotation of another rotary element of the second planetary gear set; and
   at least two or more power sources that are connected to supply driving force to the first planetary gear set and the second planetary gear set.

2. The power train for a hybrid vehicle as defined in claim 1, wherein
   the second clutch is disposed between the rotary element, which is connected with the first clutch, of the first planetary gear set and a rotary element of the second planetary gear set,
   the first brake is connected to restrain the rotary element of the second planetary gear set which is connected with the second clutch, and
   the second brake is connected to restrain the rotary element of the second planetary gear set which is connected with the third clutch.

3. The power train for a hybrid vehicle as defined in claim 2, wherein the power source includes:
   an engine connected to the input shaft;
   a first motor generator connected with a rotary element of the first planetary gear set; and
   a second motor generator connected with a rotary element of the second planetary gear set.

4. The power train for a hybrid vehicle as defined in claim 3, wherein
   the first motor generator is directly connected to any one of the rotary elements of the first planetary gear set, selectively connected to another one, and selectively connected to any one of the rotary elements of the second planetary gear set, and
   the second motor generator is connected to the rotary element of the second planetary gear set which is connected with the second brake.

5. The power train for a hybrid vehicle as defined in claim 4, wherein
   the first planetary gear set has a stepped pinion of two steps, including a first ring gear-A and a first ring gear-B engaged with the steps of the stepped pinion, respectively, and
   the second planetary gear set is a single pinion planetary gear set having three rotary elements.

6. The power train for a hybrid vehicle as defined in claim 5, wherein
   the input shaft is connected to a first carrier, which is the rotary shaft of the stepped pinion, of the first planetary gear set, and
   the output element is connected to the rotary element, which are not connected to the first brake and the second brake, of the second planetary gear set.

7. The power train for a hybrid vehicle as defined in claim 6, wherein
   a first sun gear of the first planetary gear set is connected to the first motor generator, the first carrier is connected to the engine, the first ring gear-A is connected to the first motor generator through the first clutch, and the first ring gear-B is connected to the second planetary gear set through the third clutch, and
   a second sun gear of the second planetary gear set is connected with the second motor generator and the second brake while being connected to the first planetary gear set through the third clutch, a second carrier of the second planetary gear set is connected with the output element, and a second ring gear of the second planetary gear set is connected to the first brake while being connected to the first motor generator through the second clutch.

8. The power train for a hybrid vehicle as defined in claim 7, wherein
   the first ring gear-A is engaged with the pinion having a relatively small diameter of the stepped pinion of the first planetary gear set, and the first ring gear-B is engaged with the pinion having a relatively large diameter.

9. A power train for a hybrid vehicle, comprising:
   an input shaft that receives power from an engine;
   an output element that outputs the power;
   a first planetary gear set that is connected with the input shaft and has a first number of rotary elements;
   a second planetary gear set that is disposed coaxially with the first planetary gear set, connected with the output element, and has a second number of rotary elements;
   a first clutch that is configured to selectively connect two elements of the first planetary gear set;
   a second clutch that is configured to selectively connect one rotary element of the first planetary gear set and one rotary element of the second planetary gear set;

a third clutch that is configured to selectively connect another rotary element of the first planetary gear set and another rotary element of the second planetary gear set;

a first brake that is configured to restrain rotation of one rotary element of the second planetary gear set; and a second brake that is configured to restrain rotation of another rotary element of the second planetary gear set.

10. The power train for a hybrid vehicle as defined in claim 9, wherein the first planetary gear set has four rotary elements including a stepped pinion of two steps, the second planetary gear set is a single pinion planetary gear set including three rotary elements, the rotary element of the second planetary gear set which is connected to the first brake is connected to a rotary element of the first planetary gear set through the second clutch, and the rotary element of the second planetary gear set which is connected to the second brake is connected to a rotary element of the first planetary gear set through the third clutch.

11. The power train for a hybrid vehicle as defined in claim 10, wherein the engine is connected to a first carrier of the first planetary gear set, the first motor generator is directly connected to a first sun gear of the first planetary gear set, and connected to a second ring gear of the second planetary gear set through the second clutch, the second motor generator is connected to a second sun gear of the second planetary gear set, the first brake is connected to a second ring gear of the second planetary gear set, the second brake is connected to a second sun gear of the second planetary gear set, and the output element is connected to a second carrier of the second planetary gear set.

12. The power train for a hybrid vehicle as defined in claim 11, wherein a first ring gear-A is engaged with the pinion having a relatively small diameter of the stepped pinion and a first ring gear-B is engaged with the pinion having a relatively large diameter, the first ring gear-A is connected to the first motor generator through the first clutch, and the first ring gear-B is connected to the second sun gear of the second planetary gear set through the third clutch.

* * * * *